United States Patent [19]

Campagnolo

[11] 3,982,610
[45] Sept. 28, 1976

[54] CONICAL SHAPED DISC BRAKE FOR A VEHICLE

[76] Inventor: Tullio Campagnolo, Corso Padova, 168, 36100 Vicenza, Italy

[22] Filed: Feb. 5, 1975

[21] Appl. No.: 547,251

[30] Foreign Application Priority Data
Feb. 5, 1974 Italy.................................. 20177/74
June 7, 1974 Italy................................. 23719/74

[52] U.S. Cl............................... 188/18 A; 188/26;
188/73.2; 188/366; 192/70.15
[51] Int. Cl.²............................................ B60T 1/06
[58] Field of Search................. 188/18 R, 18 A, 26,
188/71.8, 72.4, 366, 368, 369, 196 P, 73.2;
192/70.15, 85 AA, 85 CA

[56] References Cited
UNITED STATES PATENTS

| | | | |
|---|---|---|---|
| 2,102,406 | 12/1937 | Cohen............................ | 188/366 |
| 2,364,183 | 12/1944 | Ash................................ | 188/18 A |
| 2,471,956 | 5/1949 | Holl................................ | 188/18 A |
| 2,536,269 | 1/1951 | Driscoll.......................... | 188/71.8 |
| 2,551,252 | 5/1951 | DuBois........................... | 188/71.8 |
| 3,095,064 | 6/1963 | Tankersley et al. ............ | 188/72.4 |
| 3,498,417 | 3/1970 | Schmid........................... | 188/196 P |
| 3,776,597 | 12/1973 | Camps............................ | 188/26 |
| 3,858,692 | 1/1975 | Luchier et al. ................. | 188/18 A |

FOREIGN PATENTS OR APPLICATIONS
641,486   8/1950   United Kingdom................ 188/71.8

*Primary Examiner*—Stephen G. Kunin
*Assistant Examiner*—Edward R. Kazenske
*Attorney, Agent, or Firm*—Young & Thompson

[57] ABSTRACT

A disk brake, of the type embodying the brake disk in the hub of the vehicle wheel and especially a motorcycle wheel, having: at least one brake disk, the braking surface of which is a conical surface, which brake disk connects the actual hub of the wheel with the spokes carrying flange of the wheel itself; and at least one non-rotating brake plate, placed to the side of the hub and provided with friction pads lying on a conical surface adapted to engage with the braking surface of the disk, said brake plate being slidable along the wheel axis in order to establish or interrupt braking engagement between said friction pads and said disk, under the opposing action of fluid pressure control means and of spring return means.

13 Claims, 6 Drawing Figures

CONICAL SHAPED DISC BRAKE FOR A VEHICLE

BACKGROUND OF THE INVENTION

1. Field of the Invention

The present invention relates to a disk brake for wheels of vehicles and especially for motorcycle wheels, designed to solve some important problems connected with the braking of such vehicles.

It is known that in some vehicles, typically motorcycles, the application of disk brakes has met so far with little success — in spite of the felt need to replace (especially in a large motorcycles) the drum brakes by more modern and efficient brakes — due to some problems not easy to solve. In particular, a serious difficulty was represented by the rational placement of the disk, usually arranged to the side of the wheel with the respective calipers, with consequent weight unbalances in the case of motorcycles.

2. Description of the Prior Art

In order to obtain a rational solution of this important problem, it has already been suggested to embody the brake disk in the hub of the vehicle wheel (particularly a motorcycle wheel), attributing to said disk also functions of connection between the actual hub and its flange for attachment of the wheel spokes, and to act on the disk itself with friction pads, carried by brake plates mounted on the wheel axle and discharging their own reactions onto the disk.

This solution, however — though in theory quite convincing — has not so far given, for various reasons, any acceptable practical results, so that most motorcycles of all the types being produced at present, continue to adopt the old drum brakes, with all the drawbacks deriving therefrom.

Usually, in carrying out the above solution, the brake plate connecting the hub and the wheel spokes carrying flange, has been placed according to the symmetry plane perpendicular to the axis of the wheel itself. On other occasions, use has been made of two disks, parallel to and equally spaced from said plane. The structures deriving therefrom have been, in most cases, either exceedingly heavy and bulky, as well as expensive, or insufficiently safe, due to their precarious behaviour as to stresses in use; besides, as to the removal of the heat produced by friction, they have not given fully satisfactory results.

Furthermore, in all these brakes of the prior art, the engagement between the friction pads of the brake plates and the brake disk or disks takes place by front contact, as a result of the movement of said plates according to the wheel axis and towards the wheel itself. In these brakes the forces which have to be applied in order to effect the braking, are high in respect of the braking effect obtained, and the cooperation between the friction pads and the disks takes place in a rather abrupt way, resulting in braking which is far less smooth than desirable.

SUMMARY OF THE INVENTION

The object of the present invention is to prevent all the above drawbacks and to provide a disk brake for vehicles and particularly for motorcycles having a simple and light structure, with its weight uniformly distributed in respect of the symmetry plane of the wheel perpendicular to its axis; a disk brake which may assure a proper heat removal, and which may hence be constantly efficient also in the event of prolonged use, guaranteeing a powerful braking with reduced operating efforts, and a very smooth braking.

For such purposes, the present invention relates to a disk brake for wheels of vehicles, of the type in which the brake disk is embodied in the wheel hub, and characterized by the fact that it comprises: at least one brake disk, connecting the actual hub of the wheel with the spokes carrying flange of the wheel itself; and at least one non-rotating brake plate, placed to the side of the hub and provided with friction pads, said brake plate being slidable along the wheel axis in order to establish or interrupt braking engagement between said friction pads and said disk, under the opposing action of fluid pressure control means and of spring return means; and by the fact that the braking surface of the disk is a conical surface, with the axis coinciding with the wheel axis, and that the friction pads are carried by the brake plate, so as to lie on a conical surface adapted to engage with the conical braking surface of the disk.

Preferably, in said brake, the disk will consist of a tapered frustoconical body, stiffened on both sides by radial stiffening ribs and connected to the hub and to the wheel spokes carrying flange; while the plate will consist of a flat central part and of a frustoconical peripheral part, with taper opposite to that of the disk, ending with a pads carrying flange, with taper consonant with that of the disk.

Alternatively, the disk may comprise a plate-shaped body, radially emerging from the hub and branching off at its periphery to form — in common with the wheel spokes carrying flange, to which it connects — two diverging conical surfaces; in this case, two brake plates will be provided, each equipped with friction pads and arranged opposite to each other, one on one side and one on the other of the disk (and of the hub), each of said plates being formed like the one previously described and being adapted to engage with its friction pads the conical surface of the corresponding forked disk periphery.

The fluid pressure control means of the brake according to the present invention preferably consist of a cylinder-piston unit, coaxial with the wheel axis, while the return means preferably consist either of a simple spring, fitted onto the wheel axis and interposed between the hub and the brake plate, and of hand adjustment means of the plate stroke; or of a plurality of spring devices, circumferentially distributed on the plate and adapted to automatically take up the slack.

The disk brake according to the present invention may be realized in a wide variety of embodiments, and each of the single embodiments may in turn comprise different modifications thereof.

The following description — given with reference to the accompanying drawings — merely refers to some embodiments of the invention and by no means limits the various types of brakes which could be realized by those skilled in the art, falling within the scope of the present invention.

DESCRIPTION OF THE PREFERRED EMBODIMENTS

Figure 1:
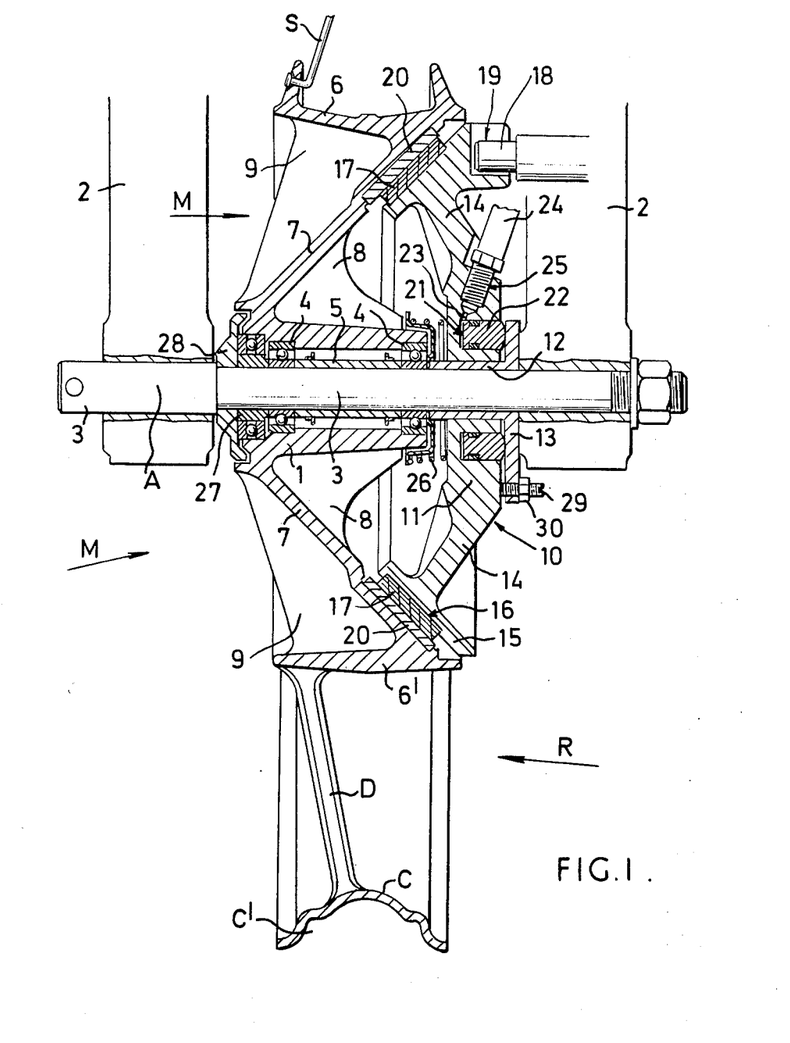
FIG. 1 is a sectional view of a first embodiment of the brake according to the invention, using a single brake plate, applied on a motorcycle wheel, said wheel being illustrated as an ordinary type spokes wheel in the top part of the drawing, and as a disk wheel in the bottom part of the drawing.

FIG. 1 of the drawings is an axial sectional view of a motorcycle wheel R, equipped with a disk brake according to the present invention. In the upper part of the figure, the wheel R is drawn as a spokes wheel, showing only the hub M, comprising an actual hub 1 and the spokes carrying flange, into the holes of which are to be inserted the ends of the spokes S. Whereas, in the lower part of the figure, the wheel R is drawn as a disk wheel, showing — in addition to the hub M — the disk D and the tire rim C, designed to house the tire in C'.

The actual hub 1 of the wheel R is supported by the ends of the fork arms 2 of the motorcycle, and is adapt to rotate on an axle 3 — mounted removably according to a known technique — thanks to the ball bearings 4, spaced from the bush 5. The actual hub 1 and the spokes carrying flange 6 (or likewise, the crown 6', from which departs the wheel disk D), forming together the hub M of the wheel R, are connected to each other by a tapered conical disk 7, provided with a plurality of radial stiffening ribs 8, between the hub 1 and the disk 7, and 9, between the disk 7 and the flange 6 (or the crown 6'). The axis of the cone-shaped disk 7 coincides with the axis A of the wheel. The disk 7 departs from an end of the hub 1, diverging towards the other end, where it connects to the flange 6 or to the crown 6'. In the wheel R structure of the upper part of FIG. 1, the hub 1, the disk 7 and the flange 6 are obtained by casting in a single piece. In the wheel structure of the lower part of FIG. 1, also the disk D and the tire rim C are obtained by casting in a single piece with the hub 1, the disk 7 and the crown 6'.

According to the invention, the disk 7 of the wheel structure described so far, is the braking disk of the disk brake embodied in the wheel itself, said brake comprising also the brake plate 10, placed near to the open side of the disk 7. This plate comprises: a central flat part 11, rotatably mounted on a bush 12 fitted onto the axle 3 and having a wide radial flange 13, bearing against the fork 2; an intermediate frustoconical part 14, with taper opposed to that of the disk 7; and a peripheral frustoconical part 15, with taper consonant with that of the disk 7.

Figure 4:
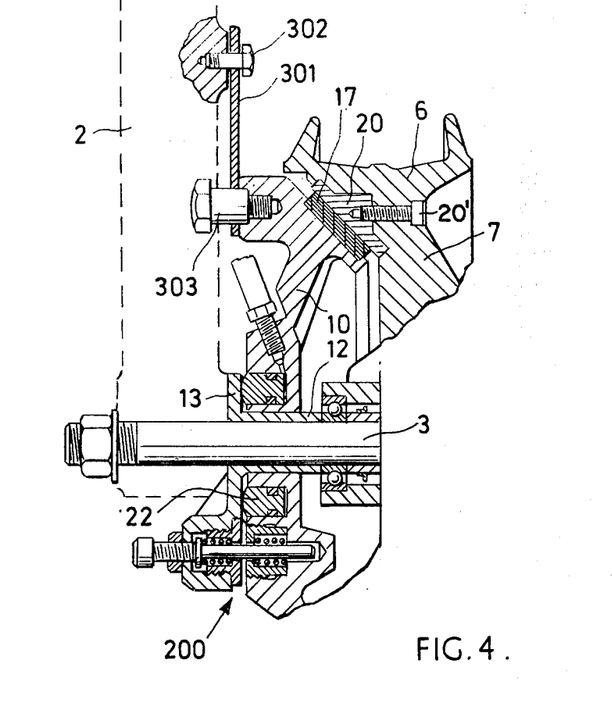
FIG. 4 is a partial sectional view of the brake, similar to that of FIG. 2, illustrating modified means for preventing the rotation of the brake plates.

The part 15 of the plate 10 bears on one side, housed in an appropriate seat 16, friction pads 17, and on the other side, it is adapted to be connected with the fork 2 — against any possible rotation on the axis A — thanks to the engagement of a pin 18 of the arm of fork 2 into an appropriate outer seat 19 of the plate. Alternatively, the fixing of the plate 10 to the fork 2, to prevent rotation, could be accomplished in many other ways, for example according to the embodiment of FIGS. 4 and 5, wherein a rod 301 is connected on one side to the fork 2 and on the other side to the plate 10, by means of two screws 302 and 303, on the shank of which it may move to a limited extent, according to the wheel axis. The friction pads 17 may either be of a desired number, arranged circumferentially in a single or in plural seats 16, or else they may consist of a single annular gasket, housed in a single seat 16; in either cases, they will be made of suitable high friction material for brakes. Such pads face a well machined part of the disk 7, or preferably, as shown, as inserted smooth ring 20, connected to the disk 7 itself in any known manner, for example by means of screws 20', as shown in FIG. 4.

The central part 11 of the plate 10 comprises, on its outer face turned towards the fork 2 and the flange 13 of the bush 12, a circular recess 21, in which is housed an annular piston 22. Hydraulic brake fluid may be fed to the bottom of the recess 21, through a pipe 23 of the plate 10, being fed by a flexible pipe 24, the threaded end of which is screwed into the appropriate seat 25 of the part 11 of the plate 10.

Between the hub 1 and the plate 10 is interposed a stout cylindrical helical spring 26, which tends to keep these two brake elements apart, driving on one side the plate 10 and its annular piston 22 against the flange 13 of the bush 12 (in turn driven against the right arm of the fork 2), and on the other side the hub 1 towards the left arm of the fork 2 (against which it presses by means of a thrust bearing 27, associated with the rolling bearing 4 at the left, and by means of a cap 28).

On the periphery of the flange 13 of the bush 12 are provided a plurality of adjustment pins 29, with lock nut 30, said pins allowing to vary the distance between the plate 10 and the flange 13 when the brake is in non-braking conditions. Three of such pins may be sufficient.

In operation, the disk brake according to the present invention behaves as specified hereunder;

During normal running of the vehicle, the hub 1 and the wheel 3, mounted thereon by means of the flange 6 and the spokes (or the crown 6', the disk D and the tire rim C), roll freely on the axle 3, the plate 10 being held close to the flange 13, in contact with the fork 2, by the action of the spring 26, so as to preclude any contact between the friction pads 17 and the ring 20 of the disk 7.

When braking takes place, the control operation performed by the driver of the motorcycle (or other vehicle) equipped with the wheel R having the brake according to the present invention, produces the inflow of brake fluid to the bottom of the recess 21, and tends to drive out of said recess the annular piston 22. Since such piston is outwardly stopped by the flange 13, the plate 10 is shifted and hence pressed towards the hub 1; consequently, the friction pad or pads 17, locked against rotation with the plate 10, engage by friction the inserted ring 20 of the disk 7 which is rotating, and tend to slow down the rotation of said disk up to stopping it, braking therewith the hub 1 and the wheel R of the vehicle.

Thanks to the conical shape of the disk 7 with the ring 20, and to the arrangement, according to a conical surface adapted to engage with the conical surface of the disk 7, of the friction pads 17 on the plate 10, the braking engagement between the parts starts very gradually, but — once it has started — it develops very intensely and efficiently, owing to the presence of a remarkable "wedging in" effect. The result is a very smooth braking (with great comfort for the driver), but also a very powerful and efficient braking, which demands from the driver only a limited control effort.

Since, on the other hand, the brake is substantially centred on the symmetry plane of the wheel perpendicular to its axis, and the heat created by the friction, which develops between the parts 17 and 20, easily finds outlets for its fast removal — thanks to the particular structure of the brake — there are no causes for unbalances, nor will there be any overheating which could alter the efficiency of the brake in its prolonged use.

It should further be noted that in the brake described here-above, it is possible to operate a simple take-up of the slack due to wear of the pads 17; for this purpose, it is in fact sufficient to loosen the nut 30 of the adjustment pins 29, and to screw these pins in such a way that a further length thereof will project beyond the flange 13, towards the plate 10, and then to lock again the nut.

In this way, the free stroke of the plate towards the brake disk, before the engagement between the pads 17 and the rings 20 is carried out, is brought back to the desired value.

The brake according to the present invention is hence provided with all the characteristics which may be desired for an application on a vast scale in the motorcycle field, in the event of wishing to obtain high performances in combination with comfort and safety, especially in sports motorcycles.

Figure 2:
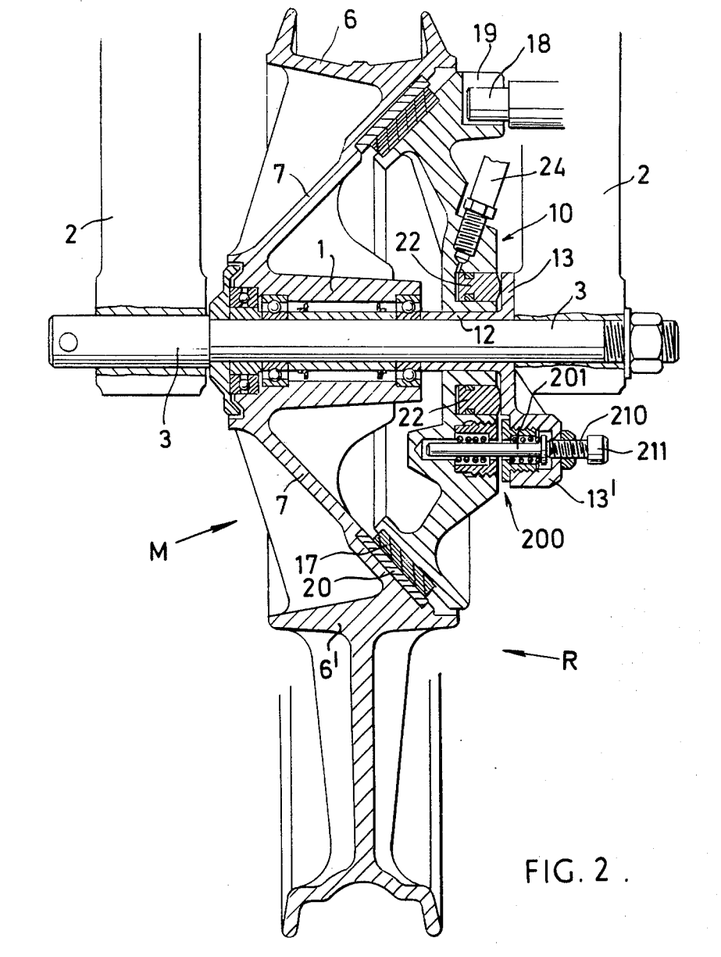
FIG. 2 is a sectional view of a brake according to FIG. 1, but using return means for the brake plate, adapted to automatically take up the slack.
Figure 5:
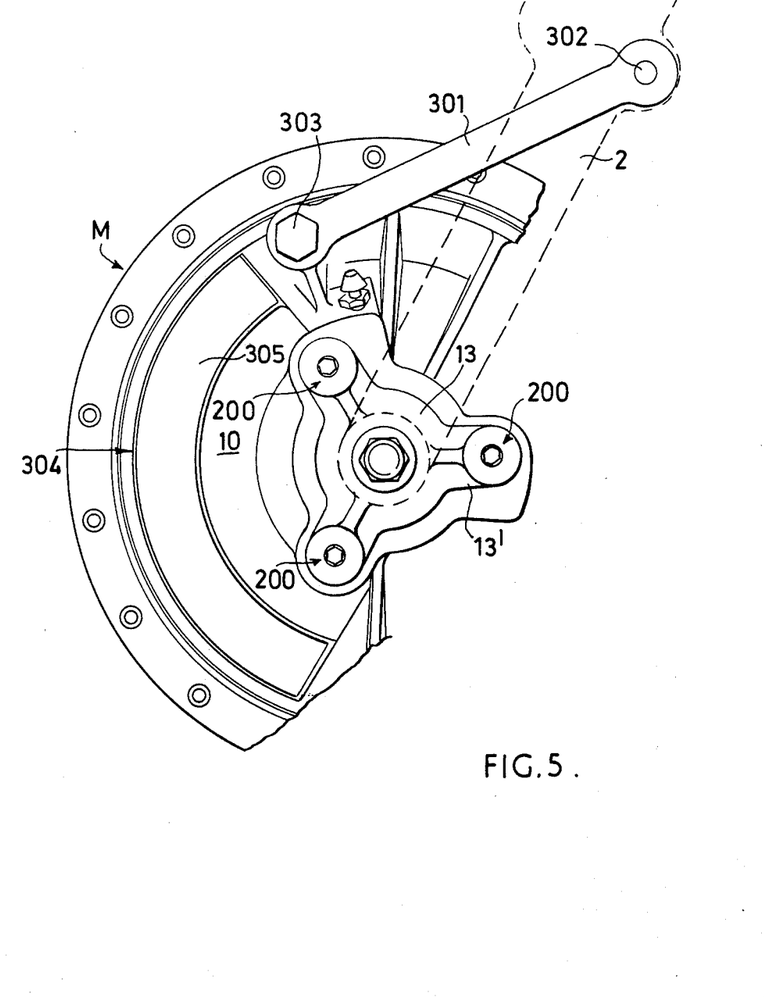
FIG. 5 is a side view of the brake according to the invention, for example according to the embodiment of FIGS. 2 and 4.

The brake shown in FIG. 2 is exactly like that of FIG. 1, save for the return means, which comprises several adjustable devices 200, adapted to automatically take up the slack and being uniformly distributed on the periphery of the flange 13 of the bush 12, which is provided for the purpose with appropriate radial extensions 13', visible in FIG. 2 and in FIG. 5.

Usually, as shown in FIG. 5, three of such devices 200 may be sufficient.

Figure 6:
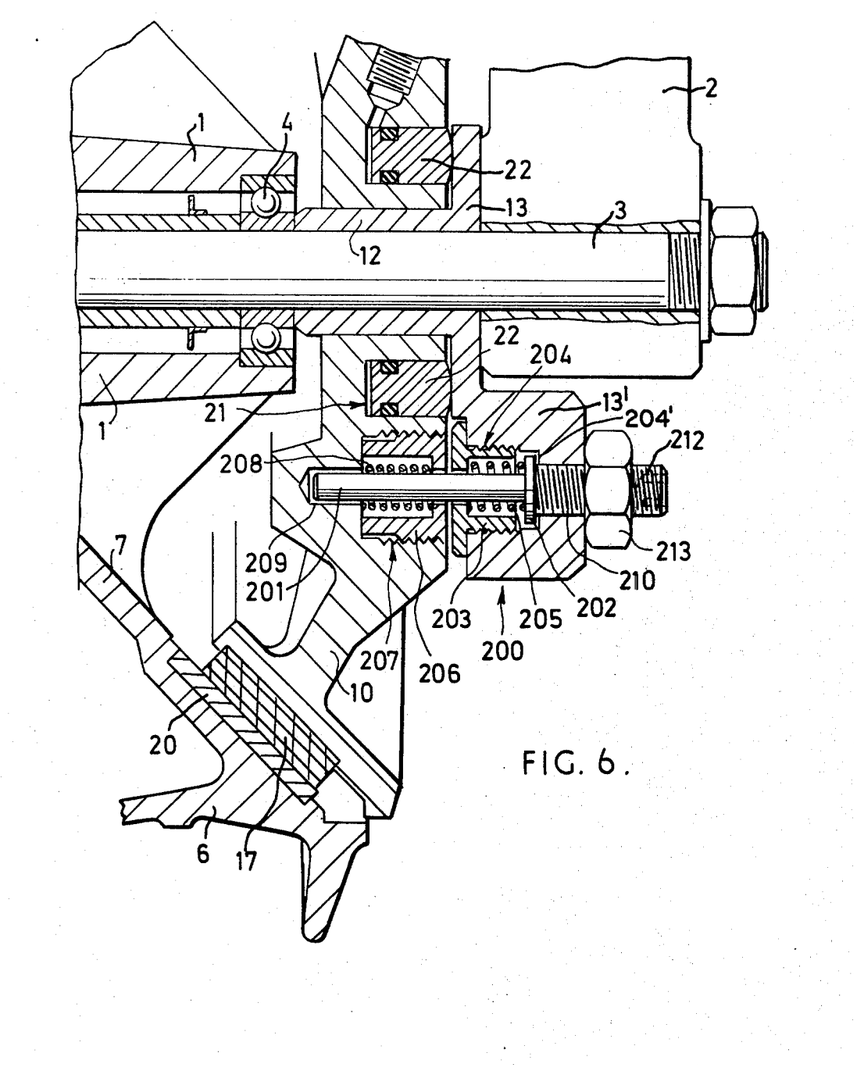
FIG. 6 shows in detail, improved return means of the brake according to the invention.

As clearly shown in FIG. 6, each of said devices comprises a pin 201 with head 200, connected with the corresponding extension 13' of the flange 13 (from which it strongly projects), by means of a threaded ring nut 203, which is fixed by screwing into the seat 204, appropriately provided on the inner side of the extension 13' of the flange 13. Between the head 202 of the pin 201 and the ring nut 203 is interposed a cylindrical helical spring 205. The pin 201 notably projects from the flange 13 to be inserted in a ring nut 206, which houses into an appropriate seat 207 of the plate 10 a cylindrical helical spring 208. The pin 201 is pressure inserted into the axial cylindrical cavity of said spring 208, in respect of which it may move only by overcoming very high friction forces. The pin 201 then extends beyond the ring nut 206 and the spring 208, housing itself in an extension 209 of the seat 207.

The bottom 204' of the seat 204 is perforated and threaded, for housing a screw 210, adjustable from the outer part of the flange 13 (by manual operation on its knurled head 211 (FIG. 2), or by operating with an appropriate tool on its hollow head 202 (FIG. 6) ), and bearing with its end against the head 202 of the pin 201. The position of this screw 210 may easily be fixed by a locknut 213, once the adjustment has been carried out.

Figure 3:
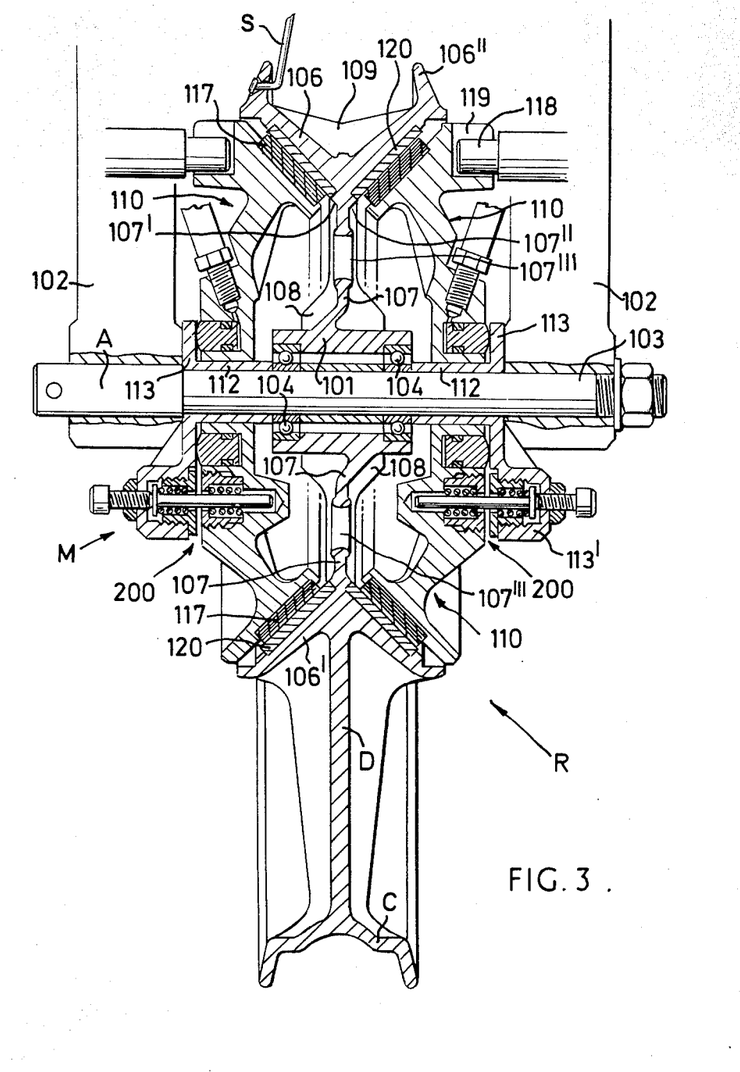
FIG. 3 is a sectional view, similar to that of FIG. 2, of a second embodiment of the disk brake according to the invention, using a forked periphery disk and a pair of opposed brake plates.

The operation of the brake of FIG. 3 does not differ from that of the brake of FIG. 1, in the active phase, with the only difference that the shifting of the plate 10 by the fluid pressure control means, does not take place against the action of a spring (26), but against the returning of the devices 200. The same devices are adapted to return the plate 10 to a non-working position at the end of the braking action. For this purpose, it is noted that when sending brake fluid under pressure to the recesses 21, so as to carry out the braking, hence shifting from the outside the plate 10 towards the hub 1, the pin 201 of each of the return devices remains locked, by friction, in the spring 208, while the plate 10 moves away from the flange 13, so that the head 202 of the pin 201 presses the spring 205. When the braking action stops, this spring tends to return the head 202 of the pin 201 to the initial position and, always thanks to the high friction engagement between the actual pin 201 and the spring 208, the whole plates 10 are hence returned to a rest position, thus disengaging the ring 20 of the disk 7 from the braking action of the friction pads 17.

As already said, the return devices 200 allow a continuous automatic take-up of the slack. Upon braking, if the slack between the pads 17 and the disk 7 has increased, in respect of the established value, the pin 201 is forced to slide — overcoming the friction — in respect of the spring 208, once the spring 205 has been fully compressed by the head 202 of the pin 201, up to when the engagement of the pads 17 with the ring 20 of the disk 7 takes place. In this way, once the parts have returned to a rest position. In this way, once the pads 17 and the ring 20 of the disk 7 is restored to its normal extent, equal to the stroke permitted to the head 202 of the pin 201 with the spring 205 in the ring nut 203.

On the other hand, the return devices 200 also allow an accurate adjustment of the slack between the brake plate 10 with the friction pads 17 and the disk 7 of the brake. For this purpose, it is to be considered that said slack is equal to the axial slack between the head 202 of the pin 201 and the ring nut 203 of the devices 200, multiplied by the sine of the angle between the disk 7 of the brake and the axis of the wheel 1. The slack of the brake may hence be adjusted (for example upon assembly of the brake) through adjustment of the slack between the head 202 and the ring nut 203 of the devices 200, by more or less screwing the adjustment screw 210 in order to limit to a smaller or wider extent the stroke permitted to the pin 201, without any sliding in respect of the spring 208.

The superiority of this system - adapted to return the brake plate with possibility of adjustment and of automatic take-up of the slack, particularly the slack due to wear of the friction pads of the brake - is evident; according to such system, it is possible to constantly keep at the desired value, chosen by the designer and established upon assembly of the brake, the distance between the pads and the brake disks, with obvious advantages for the safety and efficiency of the braking and for its smoothness. Also for the driver — especially if he is a sports driver — this is an important advantage, as he is placed in conditions of never having to vary the intensity of his own control operation according to the state of wear of the brake, and hence, both when changing the machine, and on the same machine, on a long course where the brakes are repeatedly used. Moreover, the use of the aforespecified devices allows to avoid any special adjustment of the brakes in the event of the wheel having to be removed; as soon as the wheel and brake will have been mounted again, the brake will be perfectly adjusted after the first braking. Finally, it is easy and quick to adjust the brake according to different clearance values, if this might be required. All the above remarks allow to understood that, by applying such return devices, the brake according to the invention may hence provide improved performance. This is all the more valid in the case of competition motorcycles.

FIG. 3 of the drawings shows an even more powerful type of the brake of FIG. 2. In said brake, a disk 107, arranged on the symmetry plane of the wheel R' perpendicular to the axis A', connects the hub 101 to a spokes carrying flange 106 (upper part of FIG. 3), or to a crown 106' (lower part of FIG. 3).

The flange 106 and crown 106', have a transverse V-shaped section, and the disk 107 is branched off 107' and 107'' for attachment to said flange or crown.

The disk 107 is stiffened by radial ribs 108, while ribs 109 stiffen the outer part of the flange 106 or of the crown 106'.

The flange 106 ends outwardly with two flanges 106'', provided with holes for the wheel spokes.

The crown 106' extends centrally into a disk D of the wheel, connecting the hub M to the tire rim C of the wheel.

On the two branches of the forked periphery of the disk 107, are inserted two braking rings 120 of suitable material — one on one side and one on the other of the disk 107 itself — having a highly smooth surface.

The reference 107''' indicates lightening and ventilation holes of the disk 107.

The hub 101 is rotatably mounted on two rolling bearings 104, mounted on the axle 103 of the fork 102.

Between the hub 101 and the arms of the fork 102 are further mounted two brake plates 110, each of which is identical to the plate 10 of the brake of FIG. 2, mounted in the same way, sliding on a corresponding bush 112 and locked against rotation by pins 118, emerging from the arm of the fork 102 and being engaged with seats 119 of the plates.

The plates 110 are arranged in such a way that the friction pads 117 carried thereby, are adapted to engage with the rings 120 of the disk 107.

Moreover, between each of the two plates 110 and each of the two flanges 123 of the bushes 112, are mounted several (preferably three, see FIG. 5) return devices 200, identical to those of the brake of FIG. 2.

In operation, normally the devices 200 keep the two plates 110 removed from the disk 107 and from the flange body 106, and the wheel R' is hence free to rotate. When the brake is operated, the brake fluid flows into the pistons controlling the plates 110 and these are driven simultaneously, and against the action of the devices 200, towards the hub 101, as in the case of the brake of FIG. 1. The engagement takes place — first gradual and then intense, with "wedging-in" effect — between the friction pads 117 and the rings 120 of the disk 107, and the wheel R' is stopped. When the hydraulic circuit of the brake is released, the devices 200 returns the plates 110 to the non-working position.

Compared to the brake of FIG. 2, the brake of FIG. 3 is evidently more powerful in that, with similar overall dimensions, the surfaces (which are active in respect of the braking), according to which the engagement between friction pads and brake disk takes place, are doubled. Moreover, the weight distribution, already substantially uniform in respect of the symmetry plane of the wheel in the case of the brake of FIG. 1 (as long as some constructional precautions are taken), becomes — in the case of the brake now being considered — perfectly uniform, and this evidently forms a further advantage which, in some cases, may compensate for the more complex structure and the higher cost of this version of the brake according to the present invention.

FIG. 5 of the drawings shows how — in order to help the cooling of the brake parts, which can easily become overheated due to the friction developing between the brake disks and the friction pads — the brake plates 10, of the brake according to the present invention, have been equipped with an air intake 304, pointing towards the running direction of the motorcycle (or other vehicle on which the wheel is applied) and which are protected by a grid 305. In correspondence with this air intake, there are of course air outlets or vents (not shown).

By this arrangement, applicable to all the illustrated embodiments of the brake according to the invention, the more delicate parts (brake disk or rings and friction pads) are efficiently protected from dirt and weather, which makes the brake securely sufficient also in bad conditions of use.

It is understood that the disk brake of the present invention may be realized, as already specified, also in other embodiments thereof, by combining its characteristics with those of the known-type disk brakes, and by modifying those described herein, without thereby departing from the scope of the invention itself.

In particular, it is evident that no importance should be attributed to the direction of the taper of the brake disk and of the corresponding friction pads, which direction may be opposite to that shown in the accompanying drawings. Furthermore the cooperating conical surfaces of the disk and of the plate may have a different taper from that illustrated.

I Claim

1. A disc brake for a wheel of a vehicle, said vehicle wheel having a hub, said hub including an annular flange surrounding said hub, an annular rim surrounding said flange for carrying a tire, and a plurality of spokes interconnecting said flange and said rim, an annular brake disc on said hub radially inwardly of said flange, a non-rotating brake plate disposed on one side of said brake disc, means mounting said brake plate on said wheel for sliding movement parallel to the wheel axis toward and away from said brake disc, said brake plate having at least one friction pad thereon that engages with said brake disc when said brake plate is in its position nearest said brake disc, said brake disc having a braking surface which engages an adjacent surface of said at least one friction pad, said surfaces lying on a common cone coaxial with said wheel, the apex of said cone being directed away from said brake plate, fluid pressure means for urging said at least one friction pad and said braking surface of the disc into engagement with each other, said fluid pressure means comprising a cylinder-piston unit, coaxial with the wheel axis, comprising a circular recess on the side of a central flat part of the plate which is opposite the disc, an annular piston housed in said recess, and means for feeding brake fluid under pressure to the bottom of said recess, between said bottom and the piston, as well as a contrast element opposing the thrust of said piston, said piston bearing freely against said contrast element on the side of said piston which is opposite the disc, and spring means urging said braking surface and said at least one friction pad apart.

2. Disk brake as in claim 1, wherein the disk consists of a tapered frustoconical body, stiffened on both sides by radial stiffening ribs and connected to the hub and to the wheel spokes carrying flange; while the plate consists of a flat central part and of a frustoconical peripheral part, with taper opposite to that of the disk, ending with a pad carrying flange, with taper consonant with that of the disk.

3. Disk brake as in claim 1, wherein the disk comprises a plate-shaped body, radially emerging from the hub and branching off at its periphery to form — in common with the wheel spokes carrying flange, to which it is connected — two diverging forked conical surfaces, a second brake plate similar to the said brake plate is provided, said plates being arranged opposite to each other, one on one side and one on the other side of the disk, said plates being each formed by a central flat part and by a peripheral frustoconical part, with taper opposite to that of the surface closer to the forked area of the disk, ending with a pad carrying part with taper consonant with that of said surface, so that each plate is adapted to engage with its at least one friction pad the conical surface of the corresponding forked periphery of the disk.

4. Disk brake as in claim 1, wherein the spring means is interposed between the wheel hub and the brake plate, and screw adjustment means in said contrast element, said screw means cooperating with said brakeplate.

5. Disk brake as in claim 1, wherein said spring means comprise a plurality of devices, circumferentially distributed on the brake plate and acting between said plate and said contrast element, said devices comprising means for adjustment of the slack between the brake disk and the brake plate, and means assuring an automatic take-up of the additional slack resulting from use.

6. Disk brake as in claim 3, wherein the brake plate is mounted on a bush fitted onto an axle of the wheel and comprising, at one end, a flange forming said contrast element, said flange bearing in turn against a fixed element of the vehicle, on which is mounted the wheel carrying the brake.

7. Disk brake as in claim 6, wherein said devices distributed on the brake plate each comprise a spring, tied to the plate, and a pin projecting parallel to the wheel axis from said flange and penetrating into a seat of the plate housing said spring, to be held by the latter into friction engagement.

8. Disk brake as in claim 7, wherein said pin is mounted in said flange by means of a ring nut, holding a second spring acting on an end head of the pin, while the spring in the plate is also held in its seat by a ring nut.

9. Disk brake as in claim 8, wherein the slack between said head of the pin and said ring nut in the flange, is adjustable by means of a screw being screwed into the bottom of the flange seat for the pin, said screw acting with its end on said head and being controlled from the outer part of the flange, after previous unlocking of a locknut.

10. Disk brake as in claim 1, wherein said at least one friction pad consists of a single peripheral ring, at the periphery of the brake plate.

11. Disk brake as in claim 1, wherein the part of the conical surface of the disk, engaged by the at least one friction pad, is a machined smooth part.

12. Disk brake as in claim 1, wherein the part of the conical surface of the disk, engaged by the at least one friction pad, consists of an inserted ring with smooth surface.

13. Disk brake as in claim 12, wherein said ring is fixed to the plate by means of screws.

* * * * *